United States Patent [19]

Katsuhara et al.

[11] Patent Number: 4,899,325

[45] Date of Patent: Feb. 6, 1990

[54] FINE ACCESS METHOD AND CIRCUIT FOR AN OPTICAL DISK DRIVE USING A MULTI-TRACK JUMP

[75] Inventors: Wataru Katsuhara, Atsugi; Shigeru Arai, Zushi, both of Japan

[73] Assignee: Fujitsu Limited, Kawasaki, Japan

[21] Appl. No.: 190,644

[22] Filed: May 5, 1988

[30] Foreign Application Priority Data

May 7, 1987 [JP] Japan .................................. 62-112047

[51] Int. Cl.$^4$ .......................... G11B 7/00; G11B 21/08
[52] U.S. Cl. ....................................... 369/32; 360/78.06
[58] Field of Search ..................... 369/32, 43, 44, 46; 360/78.04, 78.06, 78.07, 78.09, 78.11

[56] References Cited

U.S. PATENT DOCUMENTS

| | | | |
|---|---|---|---|
| 4,057,832 | 11/1977 | Kappert | 369/32 |
| 4,106,058 | 8/1978 | Romeas et al. | 369/32 |
| 4,138,663 | 2/1979 | Lehureau et al. | 369/32 |
| 4,166,970 | 9/1979 | Cardot et al. | 360/78.06 |
| 4,268,745 | 5/1981 | Okano | 369/44 |
| 4,375,091 | 2/1983 | Dakin et al. | 369/32 |
| 4,432,082 | 2/1984 | Hsieh et al. | 369/32 |
| 4,591,933 | 5/1986 | Quackenbush | 360/78.06 |
| 4,598,394 | 7/1986 | Nonaka | 369/32 |
| 4,630,250 | 12/1986 | Nonomura | 369/32 |
| 4,730,290 | 3/1988 | Takasago et al. | 369/32 |
| 4,740,939 | 4/1988 | Kimura et al. | 360/78.06 |
| 4,817,069 | 3/1989 | Shigemori | 369/32 |
| 4,819,219 | 4/1989 | Nagano | 369/32 |
| 4,835,754 | 5/1989 | Yamamoto et al. | 369/32 |

FOREIGN PATENT DOCUMENTS 60-205836 10/1985 Japan .
61-22479 1/1986 Japan .
61-230630 10/1986 Japan .
62-54835 3/1987 Japan .

OTHER PUBLICATIONS

Bates, Everett et al., "Seek Techniques For The Optotech 5984 Optical Disk Drive," SPIE, vol. 695, Optical Mass Data Storage II, Aug. 1986, pp. 138-140.

*Primary Examiner*—Donald McElheny, Jr.
*Attorney, Agent, or Firm*—Staas & Halsey

[57] ABSTRACT

A fine access method for an optical disk drive uses a multi-track jump method to cover a wide range of several hundred tracks at a high speed. According to the present invention, one-shot acceleration and deceleration pulses with a short width are sent to an actuator head immediately after every one-half track pitch travel of the actuator head. The actuator head is accelerated when the travel time for one-half track pitch is slower than a first reference time and it is decelerated when the travel time is faster than a second reference time. When the travel time is between the first and second reference times, no pulse is sent to the actuator head. Thus the velocity of the actuator head is compensated and maintained within a specified range of deviation for a whole long range of jumping a plurality of tracks.

14 Claims, 7 Drawing Sheets

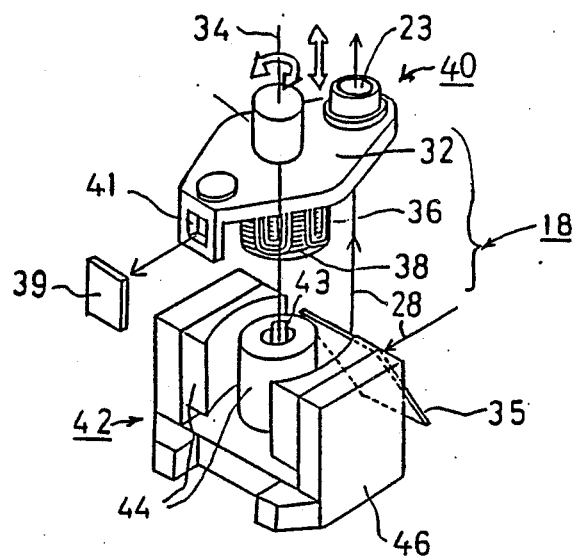
FIG. 2   PRIOR ART
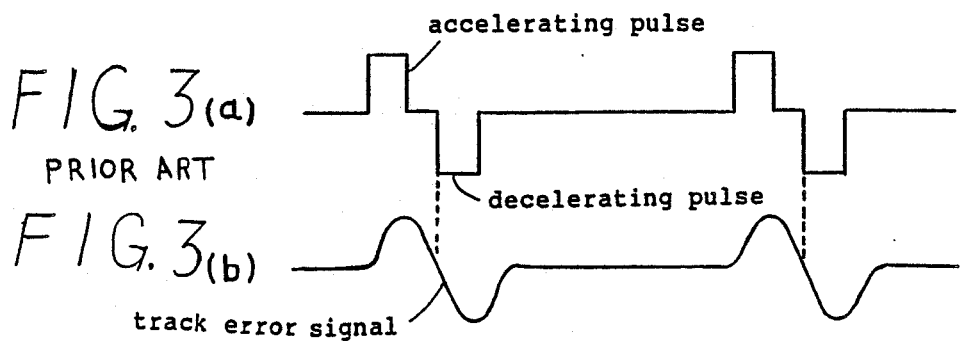
FIG. 3(a) PRIOR ART
FIG. 3(b)

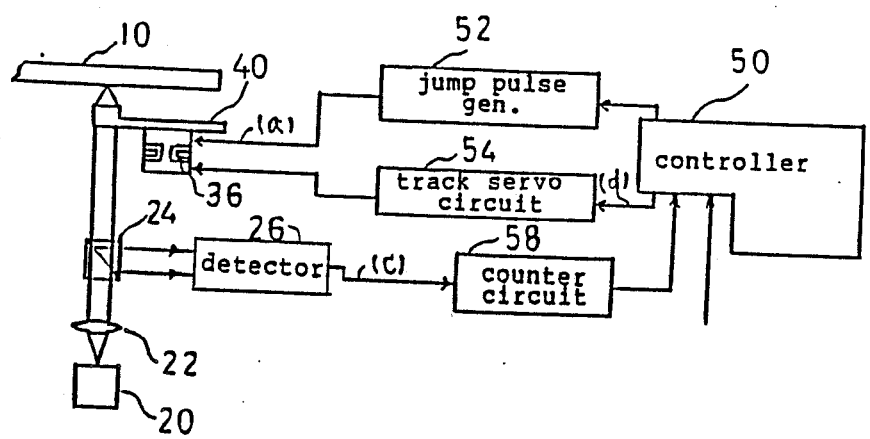
FIG. 4 PRIOR ART
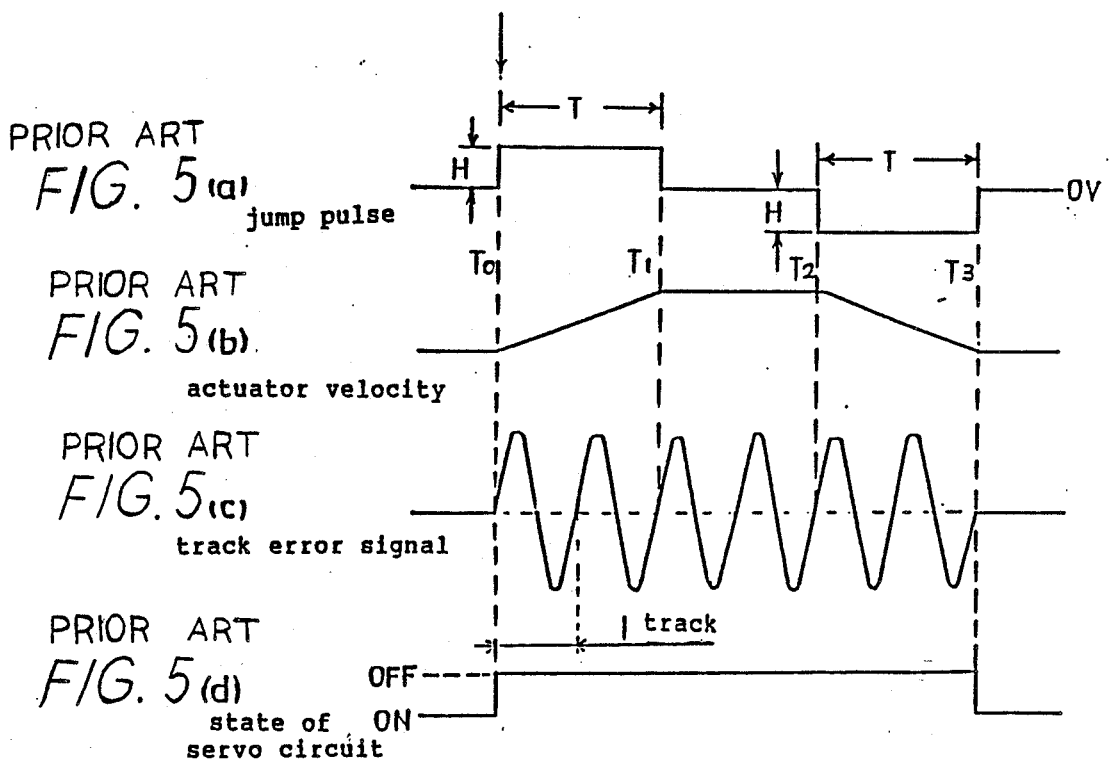
PRIOR ART
FIG. 5(a) jump pulse
PRIOR ART
FIG. 5(b) actuator velocity
PRIOR ART
FIG. 5(c) track error signal
PRIOR ART
FIG. 5(d) state of servo circuit track error signal track error signal accelerating pulse decelerating pulse

FINE ACCESS METHOD AND CIRCUIT FOR AN OPTICAL DISK DRIVE USING A MULTI-TRACK JUMP

BACKGROUND OF THE INVENTION

1. Field of the Invention

The present invention relates to an access method for an optical disk drive and, more particularly, to a precise and high speed access method involving a multi-track or long-range jump to reach a target track.

2. Description of the Related Art

An optical disk drive is usually accessed in steps: first, a coarse access step and then a fine access step. For the coarse access step, a stepper motor or a voice coil motor (VCM) is generally used to move a carriage on which an optical head is mounted. However, positioning the optical head by a stepper motor is not precise and it is difficult to control the velocity of a VCM in order to reach a target track precisely. Therefore, the fine access step is needed to reach the target track using an actuator installed in the optical head to perform a multi-track jump. After the target track is pulled in, a track servo mechanism for the track actuator holds the target track during subsequent operation.

FIG. 1 illustrates schematically the structure of an optical disk drive, especially the relationship between an optical disk 10 and an optical head assembly 12. The disk 10 is rotated by a spindle motor 11. The optical head assembly 12 is loaded on a carriage 14 which is moved by a VCM or stepper motor 16. A light beam 28 from a laser diode 20 is collimated by a collimator lens 22 before passing through a beam splitter 24 and is focused on the optical disk 10 by an object lens 23 mounted on an actuator 18. When the optical disk drive receives a command to access a target track, the VCM or stepper motor 16 moves carriage 14 in a radial direction relative to disk 10 (as indicated by arrow 30) toward the target track in response to a control signal from a controller (not shown). After the carriage 14 has moved an instructed distance, a servo mechanism incorporated in the optical disk drive is switched on and an instantaneous track is pulled in. A photo detector 26, receives reflected light from the optical disk 10 via the beam splitter 24, detects the present track position and the deviation from the target track is calculated. When the track position is found to be within the range of fine access, coarse access is switched over to fine access.

FIG. 2 is an exploded perspective view of actuator 18. The object lens 23 is fixed on member 32, which is rotatable back and forth around axis 34 by a tracking coil 36 attached thereto and also movable up and down axially by a focus coil 38. The light beam 28 comes in from the right side of FIG. 2 and is reflected toward the object lens 23 by a mirror 35. The beam path is more complex than that shown in FIG. 1 because of the actual structure of actuator 18. The actuator or access head 40, including object lens 23, member 32 and coils 36 and 38, is inserted in magnet subassembly 42, which comprises magnet pole pieces 44 and a support yoke 46. A detector 39 is provided to detect deviation from the neutral position of actuator head 40. A light source for detector 39, such as a light emitting diode (not shown), is fixed inside window 41. One function of actuator 18 is to move the focused beam 28 radially on the optical disk 10 during fine access, and another function, after fine access is completed, is to make the focused beam 28 follow the center of the target track and to maintain precise focusing of the light beam during read/write operations of the optical disk. The above second function includes a servo operation to compensate for shifting of the beam position inwardly or outwardly due to decentering of the optical disk 10. The second function also includes moving the object lens 23 in an axial direction to maintain good focus during servo operations. Therefore, this type of actuator 18 is called a two-dimensional actuator.

There are many ways in the prior art to move the actuator head 40 in fine access. A single-track jump method (also called a micro jump method) is the most fundamental and simplest method. A pair of accelerating and decelerating current pulses is applied to the tracking coil 36 of FIG. 2 in order to move the focused beam 28 by one track pitch. Each positive pulse accelerates the actuator head 40 during a first half cycle and then the subsequent negative pulse decelerates the head 40 during the following half cycle. This single-track jump is repeated, as illustrated in FIG. 3(a), a specified number of times to reach a specified track.

The focused beam 28 moves radially on the optical disk surface by one track pitch in response to each pair of pulses. This process is followed repeatedly while the required number of tracks are counted. Photo detector 26 of FIG. 1 generates the track error signal shown in FIG. 3(b), which is responsive to the relative position of the focused beam on the chasing track of optical disk 10, and is utilized to adjust the beam position. Generally the track error signal has a sinusoidal waveform where one period corresponds to a movement of the focused beam across one track pitch between two adjacent tracks. The above single-track jump method has a demerit in that a relatively long time is required to reach the target track.

To shorten the access time, multi-track jump methods have been introduced. The methods all utilize a basically similar idea. The principle is explained using FIGS. 4 and 5. FIG. 4 shows a schematic block diagram of a system using a multitrack jump method and FIG. 5 shows the signal waveforms related to the operation of FIG. 4.

When the fine access step begins at time T0, a controller 50, comprising a microcomputer, memory circuit, etc., sends a jump command to jump pulse generator 52 and, at the same time, an open command to track servo circuit 54, both being connected to tracking coil 36 in actuator head 40. A jump pulse, such as the rectangular waveform shown in FIG. 5(a), having a duration of T is applied. The jump pulse accelerates actuator head 40 with a specified force for duration T. The rotational velocity of actuator head 40 is increased and then it is maintained at a constant speed from time T1 to T2 as shown in FIG. 5(b). At time T2, a pulse voltage of reverse polarity having the same absolute height H is applied to tracking coil 36 for duration T, and this decelerates the actuator head 40 and brings it to a standstill at time T3.

At that moment (T3), the track servo circuit 54 is again activated as shown in FIG. 5(d) by a command in a servo control signal from controller 50 and the target track is pulled in. During the access operation, a track error signal shown in FIG. 5(c) is generated in detector 26 and supplied to counter circuit 58. Counter circuit 58 counts the zero crossing points of the track error signal and is cooperatively connected to controller 50 which calculates the number of tracks to the target track. FIG. 5 shows a case in which six tracks are jumped over.

In applying a multi-track jump method, there are two problems to be solved. The first problem is decentering of the optical disk rotation and the second is a spring force effect which influences the movement of actuator head 40 of FIG. 2. The rotating optical disk has a deviation of rotation radius reaching up to 50 to 60 μm. This deviation is caused by a lack of mechanical precision of the optical disk itself during its production and further by a lack of precision in installing the optical disk on a spindle motor. The above deviation value is much larger than the track pitch such as 1.6 μm which is generally used. During the movement of the actuator head in fine access, the optical disk rotates forward by a certain angle causing a displacement of the focused beam far away from the estimated track due to decentering and this causes a failure in fine access.

As for the second problem, actuator head 40 of FIG. 2 is installed on magnet subassembly 42 and is to be rotated freely around axle 43 by activation of tracking coil 36 and moved axially by focus coil 38. However, these two coils 36, 38 are connected to outside fixed terminals by connecting wires (not shown), which supply driving current. These connecting wires exert spring forces on the actuator head 40. This spring force tends to pull back the actuator head 40 toward a neutral position during tracking and the force increases with the rotation angle of actuator head 40. Therefore, it is necessary to compensate for this force by adding a driving current to the tracking coil 36 to avoid tracking failure.

Several patents have been disclosed to solve the above problems. Japanese Patent Tokukaisho (Laid Open Patent) 61-22479 dated Jan. 31, 1986 discloses a compensation method for decentering of an optical disk in a multi-track jump using this method. Japanese Patent Tokukaisho 62-54835 dated Mar. 10, 1987 discloses that the duration of accelerating and decelerating jump pulses can be adjusted by measuring the velocity of the actuator. Japanese Patent Tokukaisho 60-205836 dated Oct. 17, 1985 discloses a compensation method for the spring force using a gradually increasing compensating current supplied to the tracking coil during a multi-track jump; however, this patent does not deal with the decentering of an optical disk. Japanese Patent Tokukaisho 61-230630 dated Oct. 14, 1986 discloses a compensation method for both the spring force and the decentering of an optical disk; however, compensation of the decentering of an optical disk is difficult in a long-range jump using this method.

In the above described methods, the estimated track error is compensated gradually during a whole jump range; therefore, if the multi-track jump is especially long, such as more than 100 tracks, it is difficult to access the target track without a failure when both decentering of optical disk and spring force should be compensated.

A completely different technique is disclosed in "Seek Techniques for the Optotech 5984 Optical Disk Drive" by Everett Bates et al., SPIE Vol. 695, *Optical Mass Data Storage*, 1986. The technique disclosed in the Bates et al. article is summarized below with reference to FIGS. 6(a) and 6(b). FIG. 6(a) shows a track error signal after the initial acceleration jump pulse. The track error signal is similar to the curve shown in FIG. 5(c). When it is assumed that the velocity of the actuator head 40 after an acceleration jump requires To, e.g., 100 microseconds, to cross one-half track pitch, each duration of Ta to Tc, Tc to Te, Te to Tg, etc., of FIG. 6(a) should be 100 microseconds ideally. In an actual case, the time required to travel one-half pitch deviates in both directions from the expected value $T_o$. The Bates et al. article discloses that every time the track error signal crosses zero, a deceleration pulse is applied, the pulse having a width of approximately half the duration of $T_o$, in this case, 50 microseconds. And then, during the remaining time, $T_o - 50$ microseconds, an acceleration pulse having the same amplitude is applied. This is shown in FIG. 6(b). All deceleration pulses between Ta and Tb, Tc and Td, Te and Tf, and Tg and Th have the same pulse width and height. In FIG. 6(b), the pulse width of Tb to Tc is 50 microseconds, the pulse widths of Td to Te, and Tf to Tg are longer than 50 microseconds and the width of Th to Ti is shorter than 50 microseconds. As a result, when the optical head moves faster than expected, it is decelerated. And on the contrary, when it moves slower than expected, it is accelerated. Thus the travel time to cross one-half track pitch is adjusted to maintain the travel time almost constant throughout fine access. However, this method has a weak point when the track error signal includes a noise pulse. When the noise pulse crosses zero level, it works to generate another decelerating pulse successively; therefore, the actuator is accelerated or decelerated too much.

SUMMARY OF THE INVENTION

An object of the invention is to provide a fine access method and circuit for a multi-track jump covering a wide range of ±400 μm.

Another object of the invention is to provide a fine access method and circuit capable of high-speeds such as less than 20 milliseconds for a 100 track jump.

A further object of the invention is to provide a fine access method and circuit in which the target track can be tracked precisely avoiding the effects of both decentering of disk rotation and spring force.

Yet another object of the invention is to provide a fine access method and circuit in which the fine access is not significantly affected by noise superposed on a tracking error signal.

A further object of the invention is to provide an optical disk access method and circuit with a coarse access step used to move among user areas and which is unneeded within a memory area assigned to a specific user, provided memory regions on the optical disk are properly assigned to individual users.

The above objects are attained by a method for controlling movement of an access head between acceleration and deceleration jump pulses respectively beginning and ending a single jump of the access head across multiple tracks on a rotating device, said method comprising the steps of: measuring a time interval required for the access head to travel a predetermined distance across the tracks; comparing the time interval measured in the first step with first and second reference time intervals, the first reference time interval being at least as large as the second reference time interval; applying an acceleration correction pulse to the access head, if the comparing indicates that the time interval measured in the first step is larger than the first reference time interval; applying a deceleration correction pulse to the access head if the comparing indicates that the time interval measured in the first step is smaller than the second reference time interval.

The above method enables the optical head to perform a long-range jump access with high speed and to pull in at the target track without a failure. Further, the method is little affected by noise superposed on the track error signal. Such noise may cause generation of an excess deceleration or acceleration pulse, but does not cause a significant velocity change.

These objects, together with other objects and advantages which will be subsequently apparent, reside in the details of the construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 2 is an exploded perspective view of an actuator in an optical head assembly;

FIGS. 3(a) and 3(b) are waveforms for explaining a fine access method of the prior art, wherein the waveform in FIG. 3(a) shows repeating pairs of acceleration and deceleration pulses and the waveform in FIG. 3(b) shows the corresponding track error signal;

FIG. 4 is a general block diagram of a circuit for driving an actuator in fine access;

FIGS. 5(a)–5(d) are waveforms produced in a multitrack jump method of the prior art, wherein the waveform in FIG. 5(a) shows jump pulses for driving the actuator, the waveform in FIG. 5(b) is an actuator velocity curve, the waveform in FIG. 5(c) is a track error signal and the waveform in FIG. 5(d) shows ON and OFF states of a track servo circuit;

FIGS. 11(a)–11(b) are graphical illustrations of velocity change after a velocity compensation pulse is applied according to the present invention, wherein FIG. 11(a) shows a case where only one reference time is used for comparison, and FIG. 11(b) shows a case where two reference times are used.

DESCRIPTION OF THE PREFERRED EMBODIMENTS

Figure 7A:
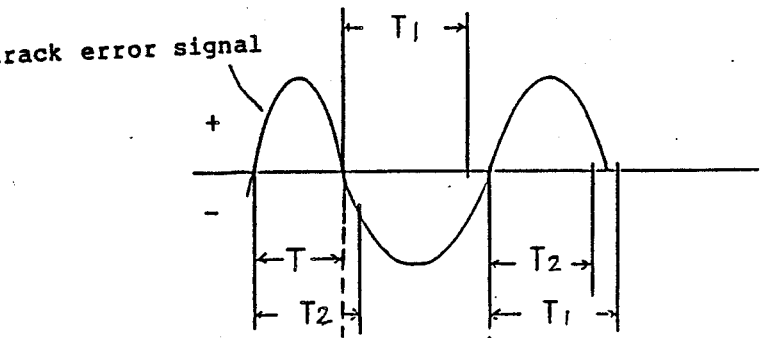
FIGS. 7(a) and 7(b) are waveforms which explain the principle of the present invention, wherein, when the track error signal illustrated in FIG. 7(a) has a zero crossing interval shorter than T2, a deceleration pulse illustrated in FIG. 7(b) is sent to the actuator, and when the interval is longer than T1, an acceleration pulse is sent.
Figure 7B:
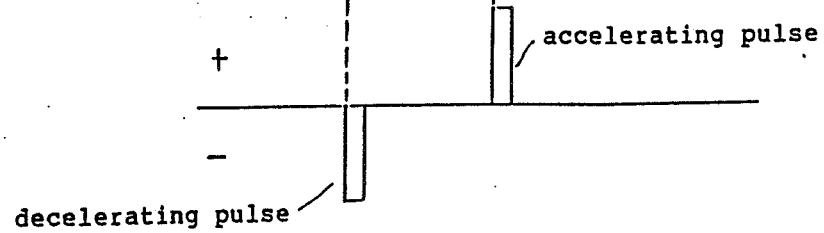

FIG. 7 shows an example of waveforms which explain the above method of the present invention. FIG. 7(a) shows a track error signal which has a changing width between two zero crossing points. Because the duration $T_A$ of the first half cycle is shorter than T2, a deceleration pulse shown in FIG. 7(b) is generated and the actuator head 40 of the optical head assembly 12 is decelerated. On the other hand, the duration $T_B$ of the second half cycle of the track error signal is longer than T1, so an acceleration pulse is generated and the actuator head is accelerated. As for the third half cycle, the duration $T_C$ is an intermediate value between T1 and T2; therefore, no pulse is generated.

Figure 1:
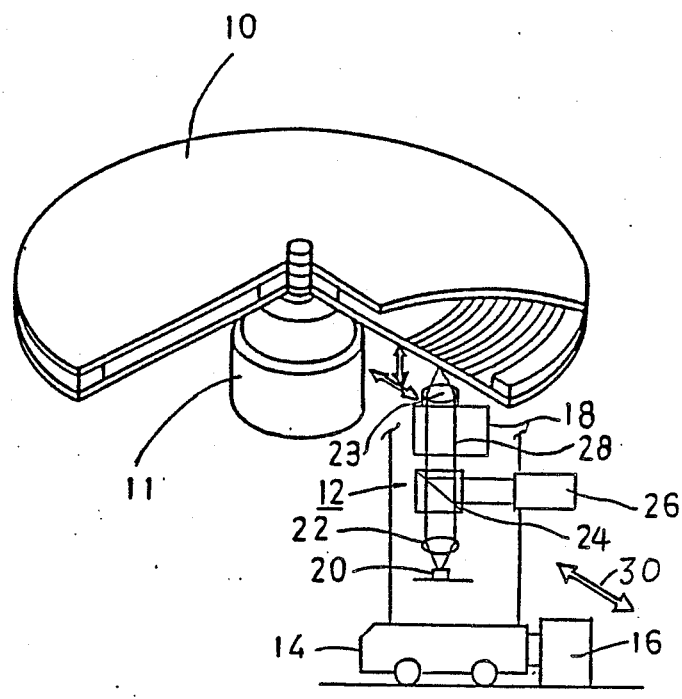
FIG. 1 is a schematic perspective view of an optical disk drive illustrating the relationship between an optical disk and an optical head assembly.
Figure 6A:
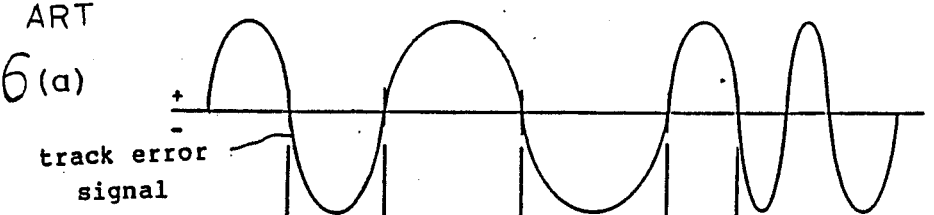
FIGS. 6(a) and 6(b) are waveforms of a multi-track jump in another prior art technique, wherein the waveform in FIG. 6(a) shows a track error signal and the waveform in FIG. 6(b) shows compensating pulses to accelerate and decelerate the actuator alternately.
Figure 6B:
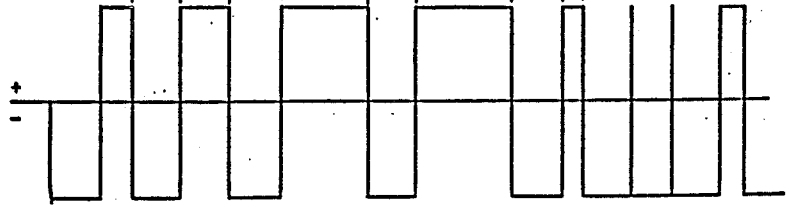
Figure 8:
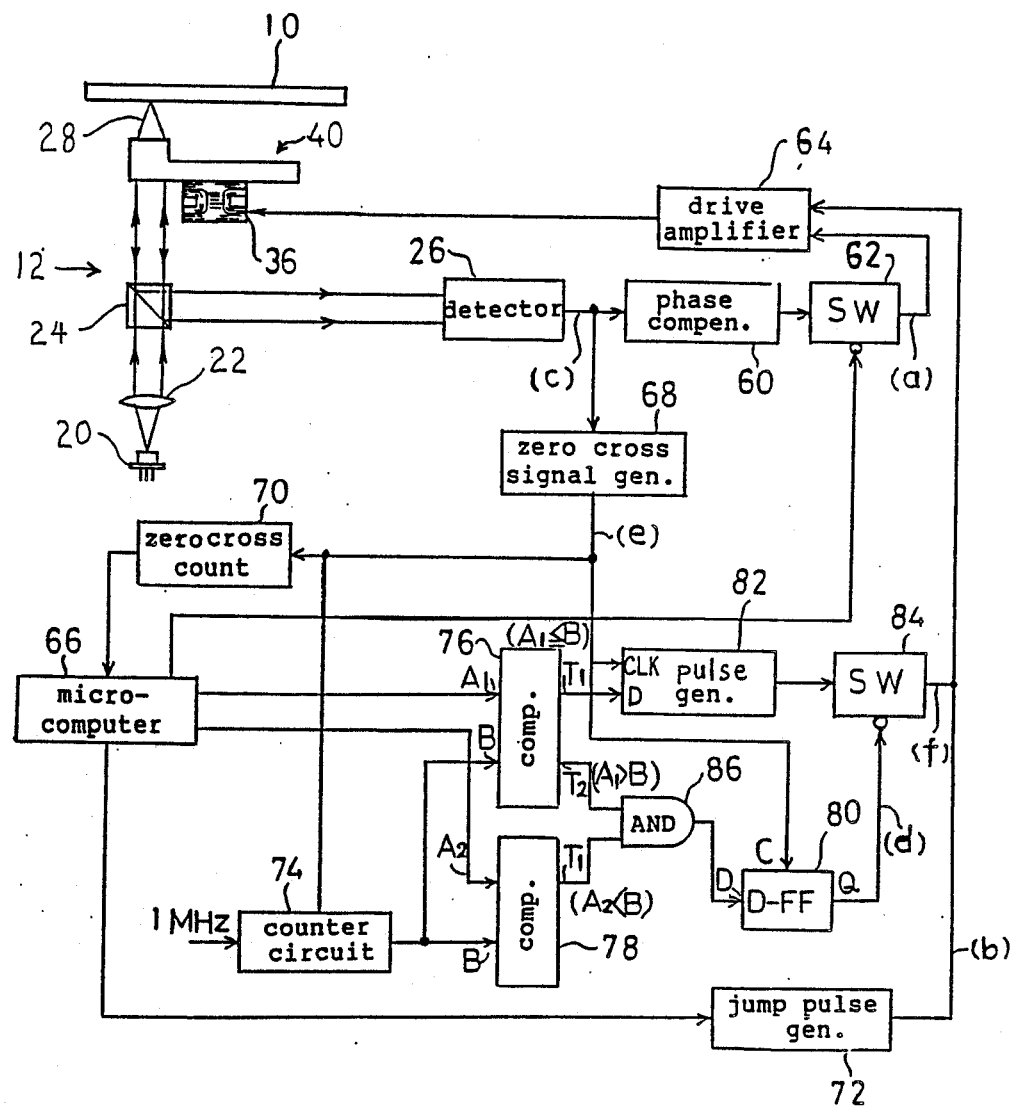
FIG. 8 is a detailed block diagram of the fine access method according to the present invention.
Figure 9:
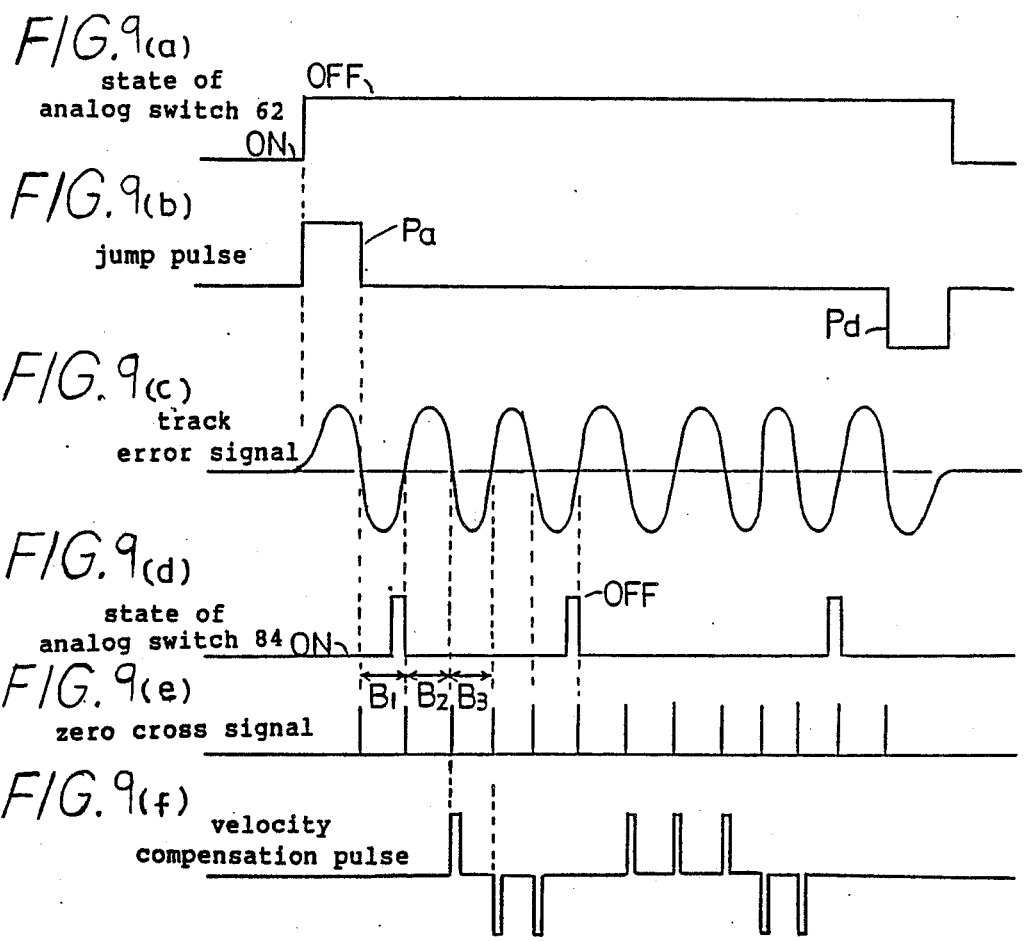
FIGS. 9(a)–9(f) are time charts of the signals which appear at several points in FIG. 8.

FIG. 8 is a detailed block diagram of an embodiment of the present invention, wherein a part of the optical head assembly 12 and optical disk 10 illustrated in FIG. 1 are schematically supplemented to illustrate the relationship with the fine access control circuit. In FIG. 8, the servo circuit which drives focus coil 38 of FIG. 2 is omitted because the present invention is not directly related to the focus servo system. FIG. 9 is a time chart to explain the details of the operation of FIG. 8.

During a read/write period while the laser beam is following the target track, the servo system operates in such a way that analog switch 62 is ON, as shown in FIG. 9(a), under the control of a command from microcomputer 66. Detector 26 detects displacement of the focused beam from the target track and generates a track error signal. The track error signal is then supplied to a phase compensator 60 and via analog switch 62 to drive amplifier 64. An amplified signal drives tracking coil 36 to maintain the focused beam 28 on the target track. Phase compensator 60 is needed to provide a stable feed back loop of the servo system.

When microcomputer 66 receives a seek command to access a different track which is accessible by fine access, analog switch 62 is switched off and the circuit for fine access according to the present invention as shown in a lower half of FIG. 8 begins to work. The track error signal as shown in FIG. 9(c) is inputted to a zero cross signal generator 68. The zero cross signal generator 68 generates a pulse signal shown in FIG. 9(e) each time the track error signal crosses zero. The zero cross signal generator 68 can be made of a circuit including a comparator, a one-shot multivibrator, etc., whereby a one-shot pulse is generated each time the track error signal crosses the zero level of the track error signal. The zero cross signal is supplied to a zero cross count circuit 70 and therein the number of tracks traversed from the start of access is counted and transmitted to microcomputer 66.

Immediately after analog switch 62 in the servo loop is switched off, microcomputer 66 sends a command to a jump pulse generator 72. An acceleration pulse Pa shown in FIG. 9(b) is supplied to drive amplifier 64 and therethrough to tracking coil 36. The tracking coil 36 accelerates the actuator head 40 during the pulse Pa. Jump pulse generator 72 has a further function of generating deceleration pulse Pd after the number of tracks to be traversed in the seek process has been counted. Deceleration pulse Pd has a reverse polarity which decelerates the actuator head 40 to a standstill.

A counter circuit 74 is driven by a clock signal of, e.g., 1 MHz and is reset by each pulse of the zero cross signal. A time interval B, which begins at the reset pulse and ends at the next reset pulse, is measured by the number of clock signals counted. The value B increases gradually to a final value B indicative of the time between two adjacent pulses of the zero cross signal.

Meanwhile, microcomputer 66 outputs reference time intervals A1 and A2 (A1>A2). The reference values A1 and A2 are selected such that the final value B corresponding to the measured actuator head velocity is subsequently compensated to fall within the range between A1 and A2. Because the final value B corresponds to the time for the actuator head 40 to traverse a predetermined distance across the tracks corresponding to one-half track pitch, the value B increases as the velocity of the actuator head 40 becomes slower. The measured value B is preferably used to satisfy the condition of A1>B 22 A2 every time one-half track pitch is traversed.

Instantaneous interval value B is supplied to both comparators 76, 78, and the value B grows until the counter circuit 74 is reset. In comparator 76, the value B is compared with A1, and when B is greater than or equal to A1, the logic level of terminal T1 of comparator 76 has an "H" level and logic level of terminal T2 has an "L" level.

In comparator 78, the values B and A2 are compared with each other. Terminal T1 has logic level "H" only when the condition of A2<B is satisfied, otherwise it has logic level "L". Therefore, AND circuit 86 outputs logic level "H" only when the condition A1>B 22 A2 is satisfied. Under this condition, output Q of D-type flip-flop 80 changes its logic level to "H" when set by the zero cross signal which is supplied to the clock terminal of the D-type flip-flop 80. The output of flip-flop 80 is supplied to the control input of an analog switch 84. When flip-flop 80 outputs logic level "H", the analog switch 84 opens the circuit between a pulse generator 82 and drive amplifier 64 to stop sending a velocity compensation pulse.

The output at terminal T1 of comparator 76 initially has logic level "L" as time interval B starts to increase from the moment the reset pulse of the zero cross signal is produced. When the velocity of the actuator head 40 is slow, then the value B increases beyond the level A1. Under this condition (B>A1), the logic level of output T1 of comparator 76 changes to "H", and when the next pulse of the zero cross signal is supplied the clock terminal of pulse generator 82, it supplies a one-shot positive or acceleration correction pulse to the data input of the analog switch 84. However, when the velocity of the actuator head 40 is faster and the next pulse of the zero cross signal is inputted to the clock terminal while the logic level of T1 is still "L" (B≦A1), the pulse generator 82 generates a one-shot negative or deceleration correction pulse.

Figure 10:
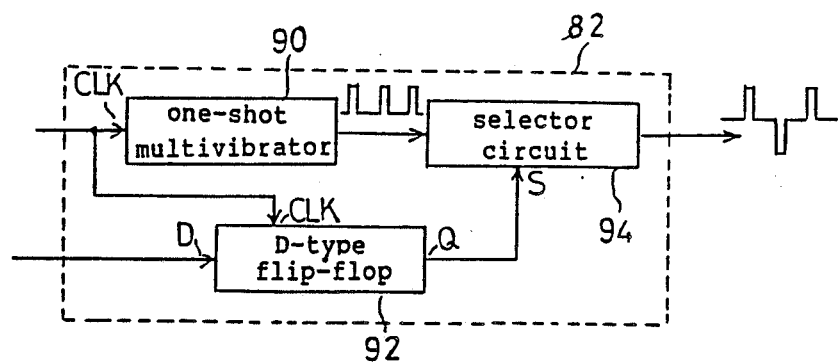
FIG. 10 is a detailed block diagram of pulse generator 82 in FIG. 8.

Pulse generator 82 can be made, for example, using the circuit shown in FIG. 10. A one-shot multivibrator 90 generates a single pulse every time it is triggered by the down edge of the zero cross signal. A D-type flip-flop 92 outputs the same logic level as that of D terminal (connected to terminal T1 of comparator 76) at the up edge of the zero cross signal. A selector circuit 94 outputs pulses corresponding to the pulses output by the one-shot multivibrator 90 with a polarity that depends on the logic level received at its selector terminal S which is connected to the D-type flip-flop 92. Thus, one-shot positive and negative pulses having the same absolute height and the same width, i.e., the same intensity and duration, can be obtained.

Returning to FIG. 8, when the conditions B<A1 and B>A2 are satisfied, the T2 terminal of comparator 76 and the T1 terminal of comparator 78 both output logic level "H". Because both inputs to AND circuit 86 are logic level "H", the output is "H" level and the D-type flip-flop 80 outputs "H" level. In response, analog switch 84 is opened and a one-shot negative pulse is not transmitted to the drive amplifier 64.

Examples of the signals produced for interval values B1, B2 and B3 are shown in FIG. 9(e). When the condition A1>B1 >A2 is satisfied, analog switch 84 is opened, as shown by the state of analog switch 84 in FIG. 9(d), and no velocity compensation pulse is output as shown in FIG. 9(f). When the condition B2>A1 is detected, an acceleration pulse is output and when B3<A2 is detected, a deceleration pulse is output, as illustrated in FIG. 9(f). The timing of the one-shot pulse and the opening of analog switch 84 should be ahead of the reset timing of counter circuit 74. The timing can be controlled, for example, by appropriately using the up edge and down edge of the zero cross signal.

When A1>B>A2 which means that the actuator head velocity is within a range between the first and second reference velocities, no compensation pulse is applied to actuator coil 36. When B≧A1, A2 which means the actuator head velocity is slower than both the first and second reference velocities, an acceleration one-shot pulse is applied. When B≦A1, A2 which means the actuator head velocity is faster than both the first and second reference velocities, a deceleration one-shot pulse is applied.

Thus the velocity of the actuator head 40 is controlled to be within the target range between two reference time intervals A1 and A2. After the specified number of tracks is counted by the zero cross count circuit 70, jump pulse generator 72 is triggered to send a negative pulse Pd as shown in FIG. 9(b) and the actuator head 40 is decelerated to a standstill, then the analog switch 62 is closed immediately, thereby activating the servo loop.

Figures 11A, 11B:
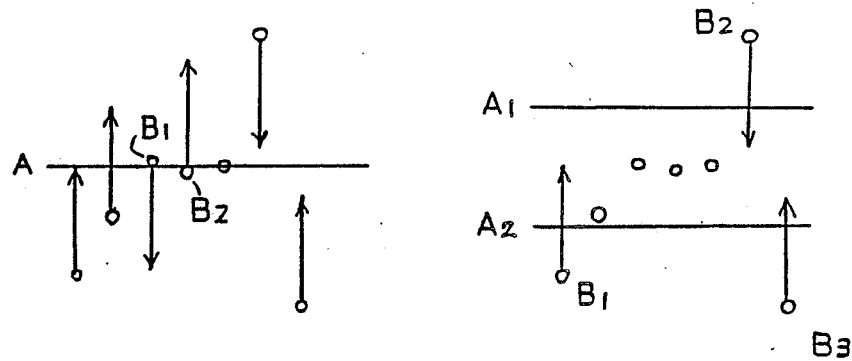

In the above embodiment, two reference time intervals of A1 and A2 are defined for controlling the velocity of the actuator head. Of course, A1 may be set equal to A2 (A1=A2=A), which means that the actuator head 40 is accelerated when B>A and it is decelerated when B<A. In this case, comparator 78 and AND circuit 86 are unnecessary, and three terminals (A<B, A=B, and A>B) of comparator 76 are utilized. However, velocity compensation is applied almost every half track and convergence of deviations from the target speed is not very good compared to the two reference value method. FIG. 11(a) is an example of velocity compensation when the time interval B is compared to a single reference time interval A resulting in divergence from the target velocity represented by A. Thus, the stability of jump movement in this method is inferior to the two reference value method. On the contrary, FIG. 11(b) shows that, when a velocity target zone ranging from A1 to A2 is used, measured velocity data such as B1, B2, and B3 located out of this zone converges within the target zone after compensation.

The access method of the present invention does not intend to control the actuator head rigorously. The purpose of the method is to keep the velocity within a range where the track servo mechanism can pull into the target track. This flexibility allows the use of pulses with fixed height and width to compensate the velocity deviation caused by decentering of disk rotation and the wire spring forces.

One of the merits of using fixed pulses is that the velocity change after compensation is limited within an acceptable value even when there is an error in detecting the velocity. The method disclosed in the article by Bates et al. as described above uses a large pulse width to decelerate the actuator head 40; therefore, if the track error signal contains a noise pulse, the actuator head 40 is decelerated excessively and, in some cases, it becomes impossible to control the actuator head 40. On the other hand, the method of the present invention can provide a wider control range of the actuator head velocity.

A multi-track jump method according to the present invention is very stable, and the probability that the beam 28 cannot be pulled into the target track is less than $10^{-4}$. Moreover, the beam velocity can be made five times as fast as the velocity of a repeating single-track jump. The access time is considerably shortened with this method, and jump speeds of 20 milliseconds per ±100 tracks can be obtained.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for controlling movement of an access head between acceleration and deceleration jump pulses respectively beginning and ending a single jump of the access head across multiple tracks on a rotating device, said method comprising the steps of:
   (a) measuring a time interval required for the access head to travel a predetermined distance across the tracks;
   (b) comparing the time interval measured in step (a) with first and second reference time intervals, the first reference time interval being at least as large as the second reference time interval;
   (c) applying an acceleration correction pulse to the access head, if said comparing in step (b) indicates that the time interval measured in step (a) is larger than the first reference time interval;
   (d) applying a deceleration correction pulse to the access head if said comparing in step (b) indicates that the time interval measured in step (a) is smaller than the second reference time interval.

2. A method as recited in claim 1, further comprising the step of (e) repeating steps (a)-(d) each time the access head travels the predetermined distance during the movement of the access head between the acceleration and deceleration jump pulses.

3. A method as recited in claim 2, wherein the tracks are separated by a constant pitch and the predetermined distance is defined in terms of the constant pitch.

4. A method as recited in claim 3, wherein the predetermined distance is one-half of the constant pitch.

5. A method as recited in claim 2, wherein the acceleration and deceleration correction pulses have substantially identical intensity and duration and are opposite in polarity.

6. A method as recited in claim 2, wherein the acceleration and deceleration jump pulses each have a duration at least five times larger than the duration of the acceleration and deceleration correction pulses.

7. A method as recited in claim 1, wherein the first and second reference time intervals are different and said method further comprises the step of (e) preventing application of any correction pulse if said comparing in step (b) indicates that the time interval measured in step (a) is smaller than the first reference time interval and larger than the second reference time interval.

8. A method as recited in claim 1, wherein the first and second reference time intervals are substantially equal.

9. A circuit for controlling movement of an access head between acceleration and deceleration jump pulses respectively beginning and ending a single jump of the access head across multiple tracks on a rotating device, said circuit comprising:
   measurement means for measuring a time interval required for the access head to travel a predetermined distance across the tracks;
   comparison means for comparing the time interval with first and second reference time intervals, the first reference time interval being at least as large as the second reference time interval; and
   velocity correction means for applying an acceleration correction pulse to the access head if the time interval is larger than the first reference time interval and for applying a deceleration correction pulse to the access head if the time interval is smaller than the second reference time interval.

10. A circuit as recited in claim 9, wherein the tracks are separated by a constant pitch and said measurement means comprises:
    detection means for generating a track error signal having a sinusoidal waveform with a period corresponding to the constant pitch of the tracks; and
    counter means for measuring the time interval between two adjacent zero crossings of the track error signal.

11. A circuit as recited in claim 10, wherein said comparison means comprises:
    a comparator circuit for comparing the time interval with a single reference time interval equal to the first and second reference time intervals; and
    wherein said velocity correction means comprises a pulse generator circuit, operatively connected to said comparator circuit, for generating the acceleration and deceleration correction pulses when the time interval is respectively greater than the single reference time interval and less than the single reference time interval, and for generating no correction pulse when the time interval is substantially equal to the single reference time interval.

12. A circuit as recited in claim 10, wherein said comparing means comprises:
    a first comparator circuit, operatively connected to said counter means and said velocity correction means, for comparing the time interval with the first reference time interval; and
    a second comparator circuit, operatively connected to said counter means and said velocity correction means, for comparing the time interval with the second reference time interval.

13. A circuit as recited in claim 12, wherein said velocity correction means comprises:
    a pulse generator having inputs operatively connected to said first comparator circuit and said detection means and an output for supplying sequential pulses with intensities and durations respectively substantially identical, with a timing determined by the zero crossings of the track error signal and with a polarity determined by whether said first comparator means indicates that the time interval is greater than the first reference time interval;

an AND circuit having inputs operatively connected to said first and second comparator circuits and having an output indicating whether the time interval is between the first and second reference time intervals;

a D-type flip-flop having a data input operatively connected to the output of said AND circuit, a clock input operatively connected to said detection means and an output set by each of the zero crossings of the track error signals; and an analog switch having a data input operatively connected to the output of said pulse generator, a control input operatively connected to the output of said D-type flip-flop and an output supplying the sequential pulses from said pulse generator as the acceleration and deceleration correction pulses unless said AND circuit indicates that the time interval is between the first and second reference time intervals.

14. An actuator head control circuit for an optical disk drive having tracks separated by a constant pitch, comprising:

jump pulse means for generating acceleration and deceleration jump pulses respectively beginning and ending a single jump of the actuator head across a plurality of the tracks on the optical disk;

servo loop means for tracking a target track on the optical disk;

movement control means for controlling movement of the actuator head between the acceleration and deceleration jump pulses, said movement control means comprising:

measurement means for measuring a time interval required for the access head to travel a predetermined distance across the tracks;

comparison means for comparing the time interval with first and second reference time intervals, the first reference time interval being at least as large as the second reference time interval; and velocity correction means for applying an acceleration correction pulse to the access head if the time interval is larger than the first reference time interval and for applying a deceleration correction pulse to the access head if the time interval is smaller than the second reference time interval; and switch means for disconnecting said servo loop means from control of the actuator head immediately preceding application of the acceleration jump pulse and for reconnecting said servo loop means to the actuator head immediately after application of the deceleration jump pulse.

* * * * *

UNITED STATES PATENT AND TRADEMARK OFFICE
CERTIFICATE OF CORRECTION

PATENT NO. : 4,899,325

DATED : February 6, 1990

INVENTOR(S) : Katsuhara et al.

It is certified that error appears in the above-identified patent and that said Letters Patent is hereby corrected as shown below:

Col. 3, line 68, "To" should be --$T_o$--.

Col. 5, line 41, "(a)." should be --(a)--.

Col. 7, line 7, "22" should be -->--;

line 20, "22" should be -->--.

Signed and Sealed this

Fifth Day of February, 1991

Attest:

HARRY F. MANBECK, JR.

Attesting Officer

Commissioner of Patents and Trademarks